United States Patent Office.

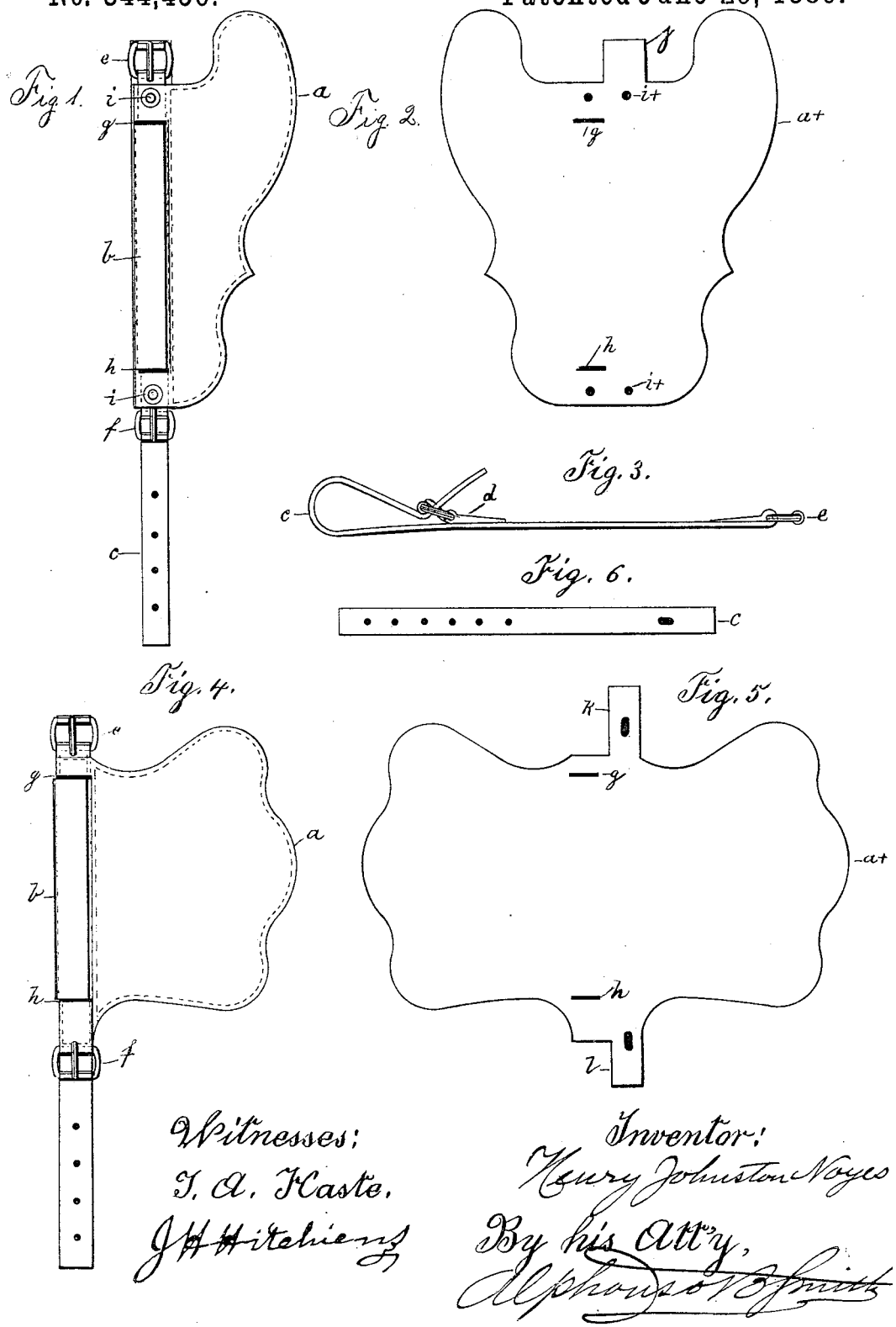

HENRY JOHNSTON NOYES, OF SAN FRANCISCO, CALIFORNIA, ASSIGNOR OF ONE-HALF TO HARRY HART AND ALFRED J. BRANDENSTEIN, BOTH OF SAME PLACE.

COMBINED BRIDLE BLIND AND LOOP.

SPECIFICATION forming part of Letters Patent No. 344,456, dated June 29, 1886.

Application filed August 31, 1885. Serial No. 175,852. (No model.)

*To all whom it may concern:*

Be it known that I, HENRY JOHNSTON NOYES, a resident of the city and county of San Francisco, State of California, have invented a new and useful Combined Horse Blind and Loop; and I hereby declare that the following is a full, clear, and exact description of the same, reference being had to the accompanying drawings.
My invention relates to the combination, in one piece, of a horse blind and loop, forming a simple and cheap device for the purpose.

The following description fully explains the nature of my said invention and the manner in which I proceed to construct, apply, and use the same, the accompanying drawings beings referred to by figures and letters.

Figure 1 represents a side elevation of blind and loop, showing the billet attached, the buckle for headstall, and loop-holes. Fig. 2 is a plan view of blind and loop as cut or stamped before making up, showing loop-holes and holes for rivets. Fig. 3 is a plan view of the billet, showing the chape and attaching buckles. Fig. 4 represents a side elevation of another form of blind and loop, showing the attachment of billet and headstall to the blind and the loop-holes. Fig. 5 is a plan view of the same as cut or stamped before making up, showing the points for attaching headstall and billet-buckles and the loop-holes. Fig. 6 is a plan view of the billet.

In combining the blind and loop in one piece of leather my object is to save labor and expense and to produce a blind which shall be sightly, and at the same time comfortable to the horse. I accomplish this result by simple means.

Referring to Figs. 1, 2, my combined blind and loop *a* is shown finished, and as it is when cut or stamped before making up at *a*˟. In making up I place the end of the billet having the buckle *e* for the headstall attached against the buckle-guard *j* and partly fold the blind and fasten both parts and the billet by a rivet, *i*, through rivet-holes *i*˟. I then lay the billet along the center of the blind, lay the chape *d*, for holding the billet-buckle *f*, Fig. 3, in place at the lower end, and complete the fold of the blind, leaving the loop *b* and loop-holes *g h* outside, and rivet the parts, including the billet and chape, together. The folds of the blind and the parts attached therein may be either sewed or riveted together. In finishing the blind, which may be cut in any desired form, I stitch around the loop and the edge of the blind, Figs. 1, 4.

Referring to Figs. 4 and 5, I show a still simpler and cheaper form of blind and loop, *a*, as cut out before making up. An upper point, *k*, of the leather, is shown, to which the buckle *e*, for the headstall-strap, is sewed or riveted, instead of to the billet *c*, and a lower point, *l*, to which the billet holding the buckle for connecting with the bit is directly fastened, instead of to the chape *d*. In finishing, the blind is folded, leaving the loop and loop-holes outside.

In applying my combined blind and loop the headstall-strap enter and is attached to buckle *e*, and the end is inserted in loop-hole *g*. The billet *b* is passed through the ring of the bit, and then through the buckle *f*, in which it is attached and is inserted in the loop-hole *h*.

I claim great simplicity, cheapness, and utility in the construction of my combined blind and loop by which the blind and loop are formed in one piece and a plain smooth surface is presented to the horse's head.

Having thus fully described my invention, what I claim, and desire to secure by Letters Patent, is—

A combined blind and loop consisting of a piece of leather folded upon itself, and having a projection at either or both ends and a separate piece of leather in the form of a strap having buckles attached to it, set in between the folded piece and united thereto, substantially as set forth.

HENRY JOHNSTON NOYES. [L. S.]

Witnesses:
A. B. SMITH,
FERDINAND IMHORST.